US009939281B2

(12) United States Patent
Duale et al.

(10) Patent No.: US 9,939,281 B2
(45) Date of Patent: Apr. 10, 2018

(54) BUILDING A TRIP PLAN FROM VARIOUS SOURCES

(71) Applicant: International Business Machines Corporation, Armonk, NY (US)

(72) Inventors: Ali Y. Duale, Poughkeepsie, NY (US); Shailesh R. Gami, Poughkeepsie, NY (US); Louis P. Gomes, Poughkeepsie, NY (US); Rajaram B. Krishnamurthy, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/232,879

(22) Filed: Aug. 10, 2016

(65) Prior Publication Data

US 2018/0045528 A1     Feb. 15, 2018

(51) Int. Cl.
*G01C 21/34* (2006.01)
*G06F 17/30* (2006.01)
*G01C 21/36* (2006.01)
*G06Q 50/00* (2012.01)

(52) U.S. Cl.
CPC ....... *G01C 21/3476* (2013.01); *G01C 21/362* (2013.01); *G06F 17/3053* (2013.01); *G06Q 50/01* (2013.01)

(58) Field of Classification Search
CPC ............. G01C 21/3476; G01C 21/362; G06F 17/3053; G06Q 50/01
See application file for complete search history.

(56) References Cited

U.S. PATENT DOCUMENTS

| | | | |
|---|---|---|---|
| 8,332,741 B2 | 12/2012 | Evans et al. | |
| 8,521,787 B2 | 8/2013 | Bosworth et al. | |
| 8,855,913 B2 | 10/2014 | Certin | |
| 2011/0055043 A1* | 3/2011 | Shuchman | G06Q 10/025 705/26.5 |
| 2012/0246562 A1 | 9/2012 | Maness et al. | |
| 2013/0061154 A1 | 3/2013 | Bennett | |
| 2013/0239049 A1 | 9/2013 | Perrodin et al. | |
| 2013/0282494 A1* | 10/2013 | Newlands | H04L 67/22 705/14.66 |
| 2014/0040712 A1 | 2/2014 | Chang et al. | |
| 2014/0316829 A1 | 10/2014 | Bumbernick | |
| 2015/0278765 A1 | 10/2015 | Dantuluri et al. | |
| 2015/0330800 A1 | 11/2015 | Huyi | |

(Continued)

OTHER PUBLICATIONS

Budvytyte et al.; "Location-Based Story Telling for Mobile Tourist"; 7th International Baltic Conference on Databases and Information Systems; 2006; pp. 220-228; IEEE.

(Continued)

*Primary Examiner* — Rodney A Butler
(74) *Attorney, Agent, or Firm* — Alexa L. Ashworth; Brian M. Restauro (57) ABSTRACT

A method and system for building a trip plan from various sources is provided. The method includes receiving information detailing a planned trip from a social media website. A weighted rank is calculated for one or more stopover points associated with the planned trip. A route for the planned trip, customized for the current travelers, is created, based on the calculated weighted rank of the stopover points and on a selection from the current travelers.

20 Claims, 5 Drawing Sheets

(56) References Cited

U.S. PATENT DOCUMENTS

2015/0370888 A1  12/2015  Costa et al.
2016/0003637 A1   1/2016  Andersen
2016/0026697 A1   1/2016  Rinearson et al.

OTHER PUBLICATIONS

Fails et al.; "Mobile Collaboration: Collaboratively Reading and Creating Children's Stories on Mobile Devices"; IDC 2010; Jun. 9-12, 2010; pp. 20-29; ACM; Barcelona, Spain.
"System and Method for Travel Story Creation and Augmentation from User Generated Content"; An IP.com Prior Art Database Technical Disclosure; IP.com No. 000234894; Feb. 12, 2014; pp. 1-2.

* cited by examiner

BUILDING A TRIP PLAN FROM VARIOUS SOURCES

BACKGROUND OF THE INVENTION

The present invention relates generally to the field of social communications, and more particularly to building a trip plan based on previous trips accessed from social media.

For many travelers planning on taking a trip, it may be valuable to benefit from the knowledge and experience of others, who have taken similar trips. This may include reviews or opinions about particular landmarks and attractions, as well as recommendations for things to do and see. For example, it may be helpful to many travelers as part of the trip planning process to learn what other travelers have experienced at certain restaurants, hotels, and attractions, in the past.

SUMMARY

According to an embodiment of the present invention, a method is provided, comprising: receiving, by one or more processors, information detailing a planned trip from a social media website; calculating, by the one or more processors, a weighted rank for one or more stopover points associated with the planned trip; and creating, by the one or more processors, a route for the planned trip, based in part on the weighted rank for the one or more stopover points and a selection from a traveler.

Another embodiment of the present invention provides a computer program product, based on the method described above.

Another embodiment of the present invention provides a computer system, based on the method described above.

DETAILED DESCRIPTION

As time passes, the ability to recall and share details about past events, such as a vacation, may diminish. Embodiments of the present invention provide systems and methods for automatically building a trip plan based on various sources, and previous trip plans created by other travelers and accessed through social media.

Figure 1:
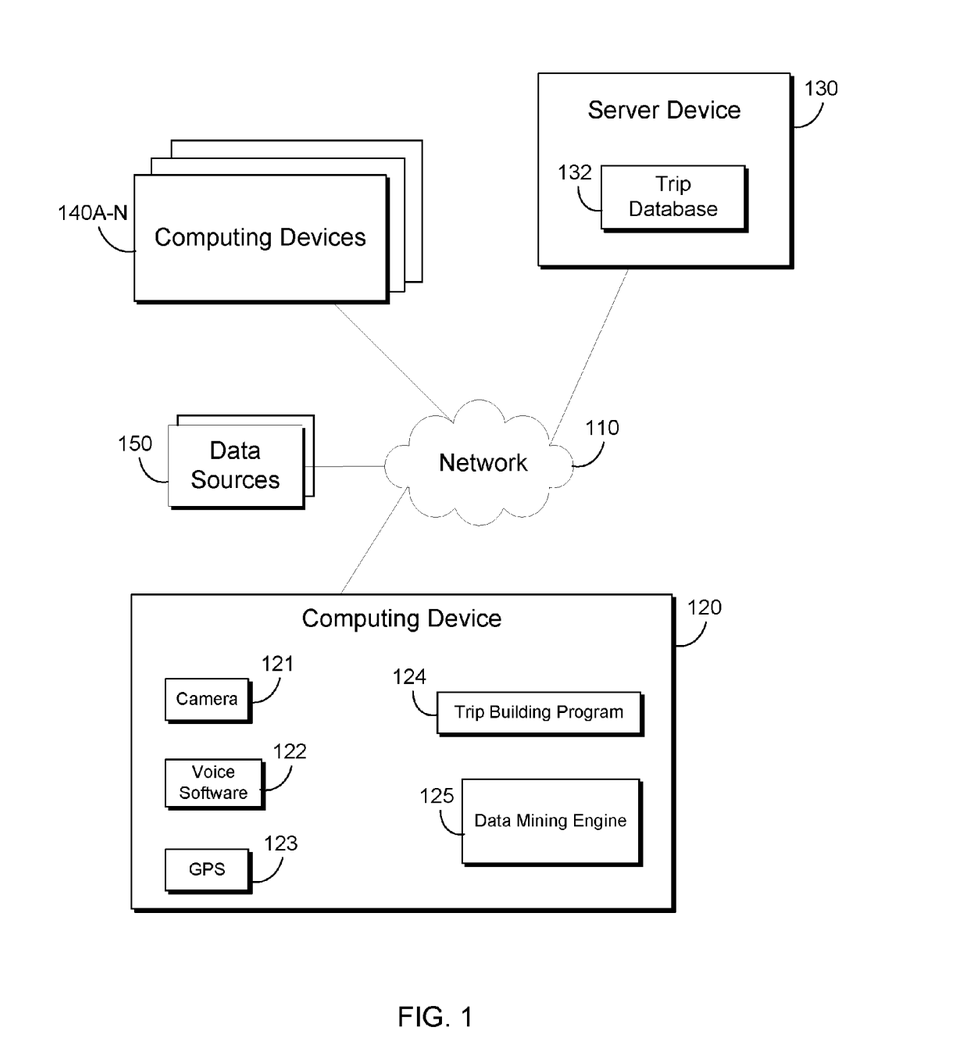
FIG. 1 depicts a trip building environment, in accordance with an embodiment of the present invention.

The present invention will now be described in detail with reference to the Figures. FIG. 1 depicts a functional block diagram illustrating a trip building environment, generally designated 100, in accordance with an embodiment of the present invention. Modifications to trip building environment 100 may be made by those skilled in the art without departing from the scope of the invention as recited by the claims. In an exemplary embodiment, trip building environment 100 includes computing device 120, computing devices 140A-N, and server device 130, all interconnected over network 110.

Network 110 may be can be, for example, a local area network (LAN), a wide area network (WAN) such as the Internet, or a combination of the two, and can include wired, wireless, or fiber optic connections. In general, network 110 can be any combination of connections and protocols that will support communication and/or access between computing device 120, computing devices 140A-N, data sources 150, and server device 130.

Server device 130 may be a management server, a computer server, a web server or any other electronic device capable of receiving and sending data. In another embodiment, server device 130 may represent a server computing system utilizing multiple computers as a server system, such as in a cloud computing environment. a remote server or a "cloud" of computers interconnected by one or more networks utilizing clustered computers and components to act as a single pool of seamless resources, accessible to computing devices 120 and 140A-N via network 110. In this exemplary embodiment, server device 130 is a web server for a social media site, and is accessible by computing devices 120 and 140A-N. Server device 130 includes trip database 132.

Trip database 132 is an information repository, and can store information associated with built trips, including: weather patterns, traffic patterns, start and destination locations, landmarks and historical sites visited throughout the trip, restaurants and hotels visited throughout the trip, overall costs associated with the trip (e.g., tolls, food, hotels, etc.), and user ratings associated with the trip (e.g., user satisfaction with a hotel or restaurant).

Data sources 150 can include media sources, such as social network services, online communities, and online news sources. Information received from data sources 150 may include information associated with social networks, weather, news channels, print media, wikis, blogs, and one or more travel websites, among other information. Information from data sources 150 may be accessed and parsed during a trip, by data mining engine 125 via network 110, and received by trip building program 124, in order to build a trip.

Computing device 120 and computing devices 140A-N may each be a computing device, such as a laptop computer, a tablet computer, a netbook computer, a personal computer (PC), a desktop computer, a personal digital assistant (PDA), a smart phone, a thin client, or any programmable electronic device capable of communicating with each other and server device 130 via network 110. In other embodiments, computing device 120 and computing devices 140A-N may be a management server, a web server, or any other electronic device or computing system capable of receiving and sending data. In this exemplary embodiment, computing device 120 is the computing device on which an initial trip is built, and computing devices 140A-N are one or more other computing devices, which can access the initially built trip. Trips can be built on any of computing devices 120 and 140A-N, and accessed by any of computing devices 120 and 140A-N. In this exemplary embodiment, computing devices 120 and 140A-N include at least camera 121, voice software 122, navigation device 123, trip building program 124, and data mining engine 125 (depicted only on computing device 120), and can include any subset of these components. In other embodiments, computing device 120 and computing devices 140A-N may include internal and external hardware components, as depicted and described in further detail with respect to FIG. 4.

Camera 121 may be any combination of hardware and software that performs dynamic image and video capture, and playback software. Camera 121 may be integrated within, and can operate on, computing device 120 (and similarly, within computing devices 140A-N). Images and videos captured by camera 121 can be used to perform facial recognition of people in an image or video, using facial recognition software known in the art.

Voice software 122 may be any voice to text software known in the art which can capture spoken words, and convert the spoken words into text. In this exemplary embodiment, camera 121 and voice software 122 are implemented together, in order for the traveler to provide a narration of a built trip (i.e., provide narrative, such as tips or user ratings, to go along with each image or video captured).

Navigation device 123 may be any navigation system known in the art. In this exemplary embodiment, navigation device 123 is a global positioning system (GPS). Trips accessed from trip database 132 can be directly uploaded to navigation device 123, in order to take a trip accessed by a traveler.

In this exemplary embodiment, trip building program 124 works with data mining engine 125 to build a trip. Trip building program 124 collects sequences of events for a given period of time and then creates a story of the events. In some embodiments, data mining engine 125 may be integrated with trip building program 124. Trip building program 124 can communicate with data sources 150 and server device 130, via network 110. Trip building program 124 builds a trip, according to inputs from a traveler and information mined from data sources 150. In other embodiments, trip building program 124 can access already built trips from trip database 132, and receive preferences of a current traveler, in order to make changes to the accessed trip, so that the trip is customized to the preferences of a current traveler (e.g., take the same already built trip, but skip all the seafood restaurants).

Figure 2A:
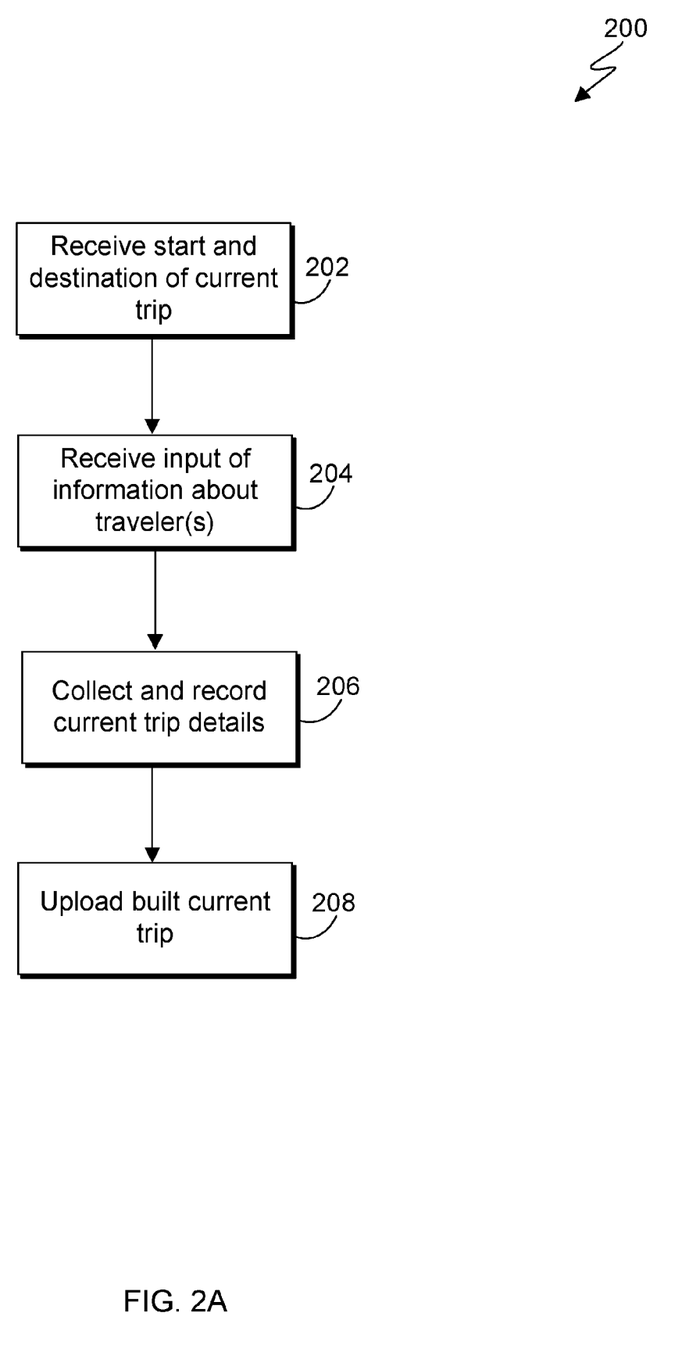
FIG. 2A depicts a flowchart illustrating operational steps for building a trip and uploading the trip to social media by a first traveler, in accordance with an embodiment of the present invention.

FIG. 2A depicts a flowchart 200 illustrating operational steps for building a trip and uploading the trip to social media by a first traveler, in accordance with an embodiment of the present invention. For illustrative purposes, the following discussion is made with respect to computing device 120 associated with a first traveler or group of travelers, it being understood that the operational steps of FIG. 2A may be performed by any of computing devices 140A-N.

In step 202, trip building program 124 receives a start and destination of a trip. In this exemplary embodiment, trip building program 124 receives a starting location and a destination location of a trip from a traveler input. In other embodiments, trip building program 124 accesses the current location of the traveler from, for example, a GPS, as the starting location, and trip building program 124 receives the destination location from a traveler input.

In step 204, trip building program 124 receives input of the information about the traveler(s) of the current trip. In this exemplary embodiment, trip building program 124 can receive information such as the means of transportation used in the current trip and which traveler(s) are taking the current trip. Trip building program 124 can record an image and the name of each traveler taking the current trip, for the first time. In other embodiments, trip building program 124 can retrieve the image associated with the name of a traveler from previously saved data. For example, trip building program 124 may receive a traveler input that four people are taking the current trip, and that a car is the mode of transportation for the first half of the trip and an airplane is the mode of transportation for the second half of the trip. Trip building program 124 can retrieve an image associated with each of the four people taking the current trip, for example, from a social media web site, and include the images with the rest of the current trip information.

In step 206, trip building program 124 collects and records details about the current trip. In this exemplary embodiment, trip building program 124 receives details about the current trip from data sources 150, such as changes in the weather and traffic patterns throughout the current trip, each place visited and user ratings associated with the places visited throughout the current trip, and an overall cost of the current trip. In some embodiments, from the collected news and events, trip building program 124 can inform the travelers about important events that are occurring in places along the trip route. For example, trip building program 124 can inform the travelers about a parade or sporting event in a town that the travelers are passing through, based on news and events data collected from data sources 150. In another example, trip building program 124 can inform the travelers about health or safety information that may exist in areas along the trip route, such as a severe thunderstorm along the trip route, based on weather information collected from data sources 150. In an embodiment, as the travelers record images using computing device 120, trip building program 124 can allow the travelers to link narration with each image or video, in order to record further personal details about the current trip. In some embodiments, the details recorded about the current trip are based on a traveler preference. For example, based on a traveler preference, trip building program 124 may record only 150 words about each landmark the traveler visited during the current trip.

In step 208, trip building program 124 uploads the built current trip. In this exemplary embodiment, trip building program 124 uploads the completed, built trip plan (including all of the collected and recorded information associated with the trip) to a social media website, where it can be accessed by other devices, such as computing devices 140A-N, via network 110. In some embodiments, friends and family members of the current traveler(s) may access the built trip plan through social media websites, and can then use the saved trip for their own trip building (described in more detail with respect to FIG. 2B).

Figure 2B:
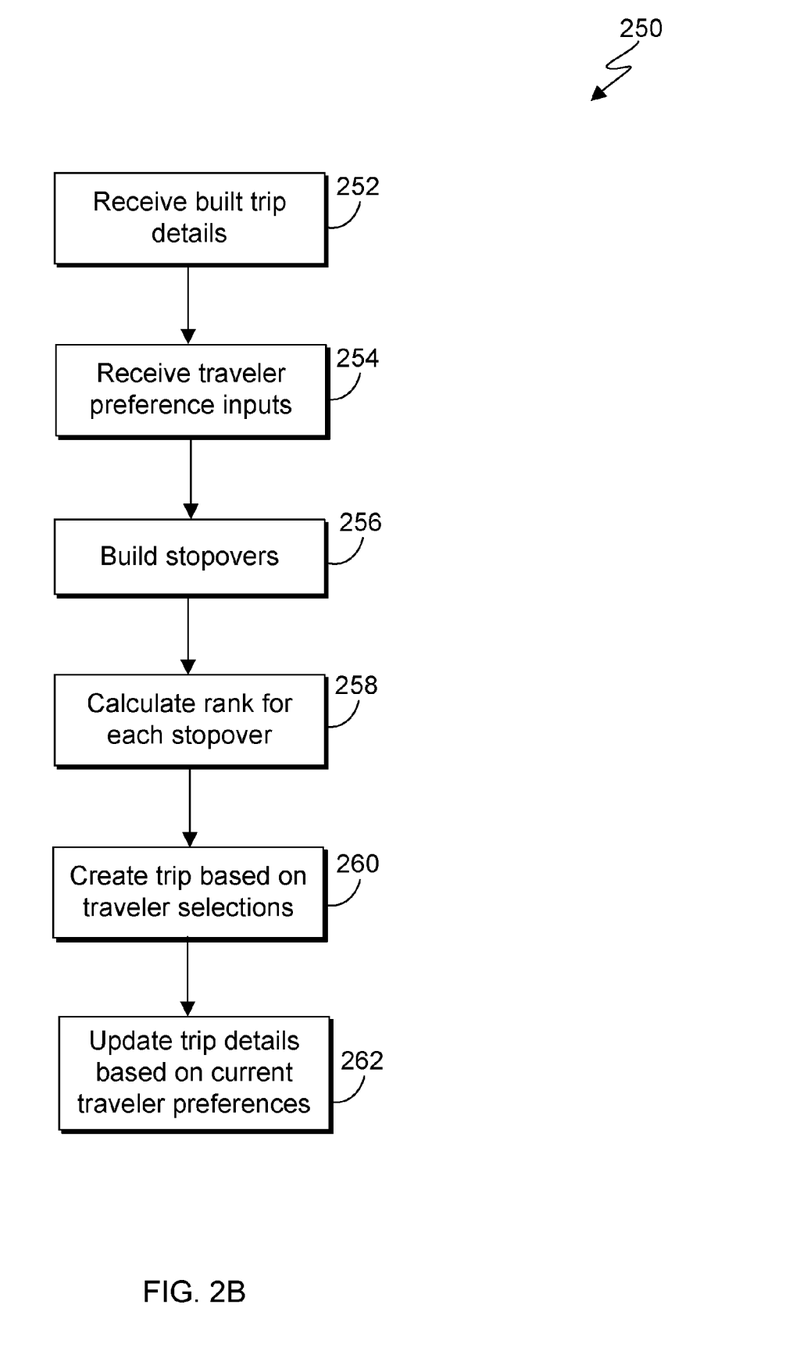
FIG. 2B depicts a flowchart illustrating operational steps for dynamically recreating a trip plan using preferences of a second traveler, in accordance with an embodiment of the present invention.

FIG. 2B depicts a flowchart 250 illustrating operational steps for dynamically recreating a trip plan using preferences of a second traveler, in accordance with an embodiment of the present invention. For illustrative purposes, the following discussion is made with respect to an instance of trip building program 124 operating on one of computing devices 140A-N associated with a second traveler or group of travelers, which has accessed a trip initially built by a first group of travelers on computing device 120, it being understood that the operational steps of FIG. 2B may be performed by any of computing devices 120 and 140A-N.

In step 252, trip building program 124 receives built trip details. In this exemplary embodiment, trip building program 124 can receive the details of a built trip, for example, downloaded from a social media website, and a second traveler or group of travelers can then alter the trip details according to their preferences.

In step 254, trip building program 124 receives traveler preference inputs. In this exemplary embodiment, trip building program 124 receives preferences from the current traveler(s). For example, trip building program 124 can receive the preferred social media of the travelers, who is taking the current trip (e.g., images and names of travelers), requests such as a shortest or longest route (i.e., enable or disable the ability to combine segments of a trip, based on the traveler preferences), and a level of flexibility, such as time, mileage, and/or cost constraints to consider, among other traveler preferences.

In step 256, trip building program 124 builds a set of stopovers. In this exemplary embodiment, trip building program 124, from the received traveler preferences and all similar previous trips built around, or intersecting, the received locations (obtained from, for example, a social media database), builds m=ΣS stopovers, where S is the stopover of each trip.

In step 258, trip building program 124 calculates a rank for each trip based on the calculated stopovers. In this exemplary embodiment, trip building program 124 calculates a cognitively weighted rank for each stopover, based on criteria such as quality, time, cost, and traveler preferences. Additionally, trip building program 124 can use object recognition for qualifying the stopovers. For example, trip building program 124 can recognize a weather pattern, based on what other people at the location of the stopover are wearing (e.g., many people wearing sweaters indicates that it is cold outside). Trip building program 124 calculates a weight for each stopover of a trip, based on the above considerations, as well as traveler preferences, and outputs a list of stopovers to the travelers, allowing the travelers to make a selection of ranked stopovers. In this exemplary embodiment, trip building program 124 can learn over time and improve its calculation of the rankings. Trip building program 124 can receive learning feedback by checking the relevancy of the ranked stopovers. For example, trip building program 124 can receive feedback by using facial recognition in captured images to determine whether the travelers look happy or scared in a crowded place, can determine an age of the stopover information, and can speculate the weather when the images were captured. This information can be fed back into trip building program 124 in real-time, allowing trip building program 124 to learn over time and improve the accuracy of the stopover calculations for the travelers.

In step 260, trip building program 124 creates the trip based on the traveler selections. In this exemplary embodiment, trip building program 124 creates a customized trip for the travelers, based on the initially-downloaded trip, as well as the preferences of the travelers, and the stopover(s) selected by the travelers. Additionally, trip building program 124 can provide recommendations to the travelers for the created trip. For example, trip building program 124 may recommend warm clothing for the travelers to bring, if trip building program 124 detects that the weather will be cold. Trip building program 124 inputs the newly customized trip into the navigation device 123, for the travelers to follow.

In step 262, trip building program 124 updates the trip details based on the current traveler preferences. In this exemplary embodiment, trip building program 124 can receive feedback in real-time from the travelers and/or data sources 150, and can update the trip route in real-time and/or update information associated with the trip. For example, trip building program 124 can update a rating on a social media website for a landmark at a stopover on the trip route, based on feedback from the travelers. In another example, trip building program 124 can update information about the trip in real-time, such as the current weather, and can update geotags about where the travelers have visited throughout the trip. In some embodiments, trip building program 124 can use devices, such as an embedded camera 121 and/or navigation device 123 to receive information and update a social media website. Additionally, as described above, trip building program 124 can receive feedback in real-time from the travelers and/or other data sources about the relevancy of its stopover determinations. In this exemplary embodiment, trip building program 124 can dynamically change the route, while in progress, as new information is received (i.e., new preferences input from a traveler and/or new information from data sources 150), such as a new road closure along the route that may lead to delays. Trip building program 124 can suggest an alternate route to get around the closure, and stay within the preferred mileage of the traveler, for example.

Accordingly, by performing the operational steps of FIGS. 2A and 2B, a trip plan can be created and used as a future reference for other travelers. In this way, details about a trip taken, such as a vacation, are recorded and saved for a traveler to look back on, as well as for other travelers to replicate (using their own preferences) the same trip in the future. A trip plan shared through a social media website, or other outlet, can help a traveler be better prepared and maximize their trip experience.

Figure 3:
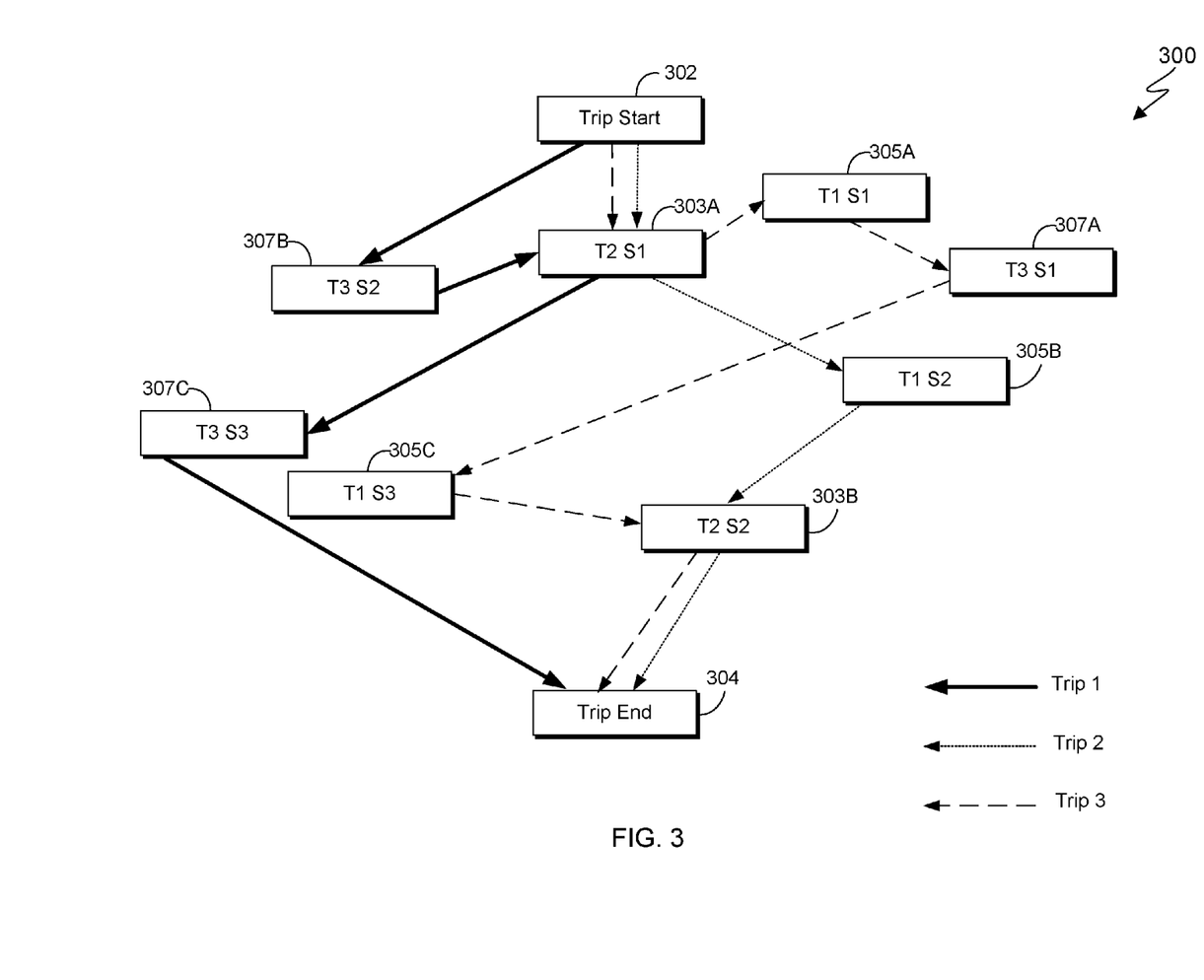
FIG. 3 depicts a schematic representation of an example of three different trip plans, including a different set of stopovers, in accordance with another embodiment of the present invention.

FIG. 3 depicts a schematic representation of an example of three different trip plans, including a different set of stopovers, in accordance with another embodiment of the present invention.

As depicted in FIG. 3, a trip start 302 and a trip end (destination) 304 are defined by the travelers (i.e., step 252 of FIG. 2B). Trip building program 124 collects other similar and/or intersecting trips from social media websites (i.e., step 256 of FIG. 2B). In this example, three similar and/or intersecting trips are obtained from social media, and the stopovers 303A-B, 307A-C, and 309A-C from each of the three similar trips are all obtained (where T is a trip, and S is a stopover). From this information, the traveler can select any stopover point, based on their preferences (e.g., time and cost considerations) and build a customized trip. For example, a traveler may start at trip start 302 and then follow the route of: (1) stopover 307B; (2) stopover 303A; (3) stopover 305A; (4) stopover 307A; (5) stopover 305C; (6) stopover 303B; and end at trip end 304 (i.e., trip 1). The traveler may opt to choose a smaller number of stopovers: stopover 303A; stopover 305B; and stopover 303B; before reaching trip end 304, for example (i.e., trip 2). Thus, various segments of different previously built trips may be combined to build the current trip. In this exemplary embodiment, trip building program 124 may calculate different trips options (e.g., three, trip 1, trip 2, and trip 3, in this example) with the determined stopovers, and present the trip options to the traveler, for the traveler to make a selection.

Figure 4:
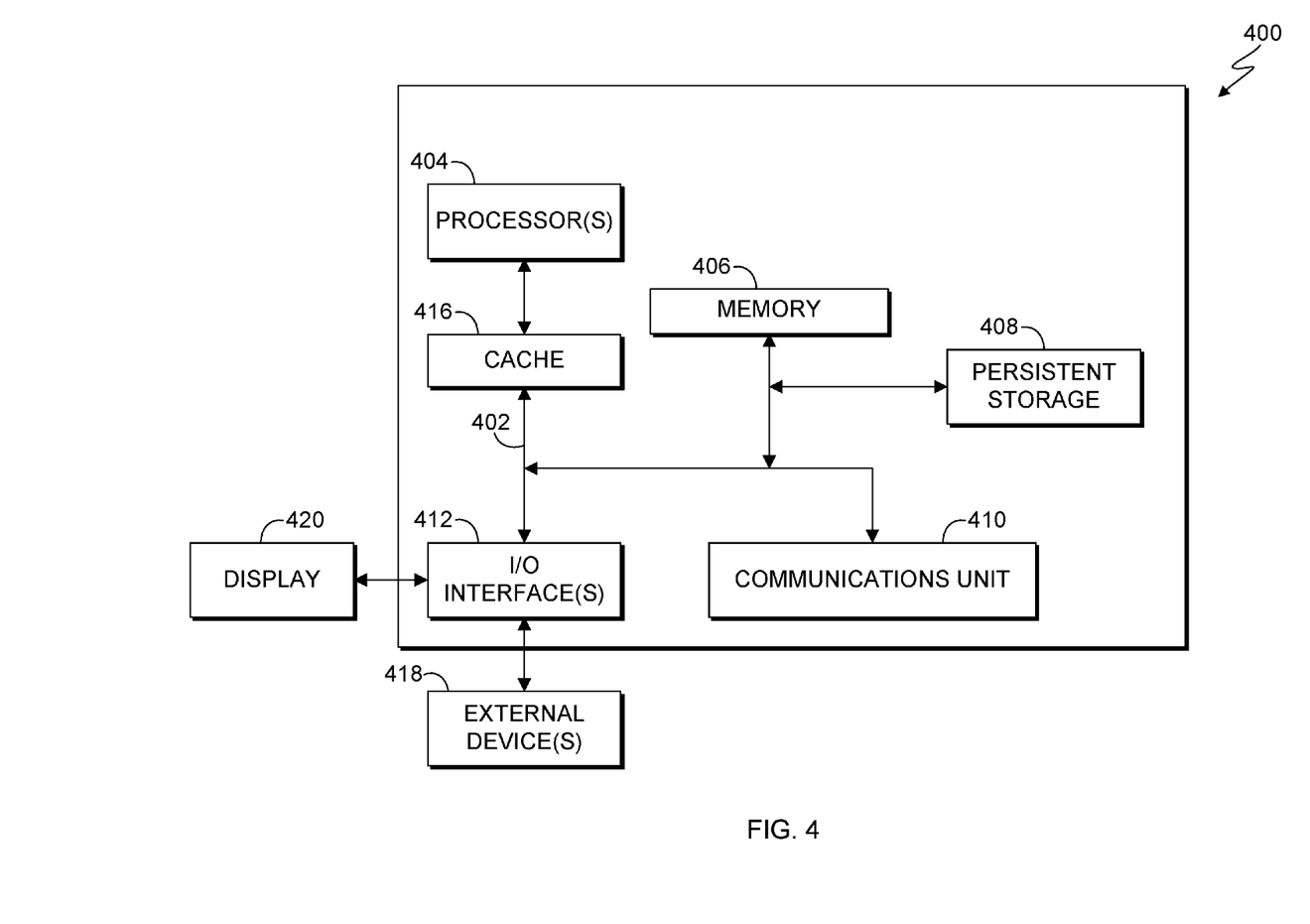
FIG. 4 depicts a block diagram of components of a computing device, in accordance with an illustrative embodiment of the present invention.

FIG. 4 is a block diagram of internal and external components of a computing device, generally designated 400, which is representative of the computing devices of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device 400 includes communications fabric 402, which provides communications between computer processor(s) 404, memory 406, cache 416, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of a network. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to computing device 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    extracting, by one or more processors, information associated with a completed trip from one or more social media websites;
    creating, by one or more processors, a route for a new trip based on the extracted information associated with the completed trip;
    generating, by one or more processors, one or more stopover points for the planned trip by accessing identified points of interests from the information associated with the completed trip;
    assigning, by one or more processors, weight values for each of the one or more stopover points based on recognized objects, facial expressions, weather information, and user preferences;
    calculating, by one or more processors, a weighted rank for each of the one or more stopover points based on the assigned weight values; and
    in response to detecting a deviation from the created route, refining, by one or more processors, the generated one or more stopover points and the created route.

2. The method of claim 1, further comprising:
    updating, by the one or more processors, the created route for the new trip, based on feedback from at least one of: the traveler or the social media website.

3. The method of claim 1, wherein the user preferences comprise: a start point, a destination point, cost preferences of the traveler, distance traveled preferences of the traveler, time preferences of the traveler, an image of each traveler on the new trip, and a rating associated with each landmark.

4. The method of claim 1, further comprising:
    receiving, by the one or more processors, feedback associated with the calculated weighted rank for the one or more stopover points associated with the new trip.

5. The method of claim 4, wherein the feedback comprises: an analyzed image from the one or more stopover points and an age of the calculated weighted rank of the one or more stopover points.

6. The method of claim 1, wherein creating a route for the new trip, based in part on the weighted rank for the one or more stopover points and the selection from the traveler, further comprises:
    combining, by the one or more processors, at least two stopover points from two different planned trips from the social media website.

7. The method of claim 1, further comprising:
    determining, by the one or more processors, an object at the one or more stopover points; and
    outputting, by the one or more processors, a determination, to the user, about information associated with the object at the one or more stopover points.

8. A computer program product comprising:
    a computer readable storage medium and program instructions stored on the computer readable storage medium, the program instructions comprising:
        program instructions to extract information associated with a completed trip from one or more social media websites;
        program instructions to create a route for a new trip based on the extracted information associated with the completed trip;

program instructions to generate one or more stopover points for the planned trip by accessing identified points of interests from the information associated with the completed trip;

program instructions to assign weight values for each of the one or more stopover points based on recognized objects, facial expressions, weather information, and user preferences;

program instructions to calculate weighted rank for each of the one or more stopover points based on the assigned weight values; and program instructions to, in response to detecting a deviation from the created route, refine the generated one or more stopover points and the created route.

9. The computer program product of claim 8, further comprising:
program instructions to update the created route for the new trip, based on feedback from at least one of: the traveler or the social media website.

10. The computer program product of claim 8, wherein the user preferences comprise: a start point, a destination point, cost preferences of the traveler, distance traveled preferences of the traveler, time preferences of the traveler, an image of each traveler on the new trip, and a rating associated with each landmark.

11. The computer program product of claim 8, further comprising:
program instructions to receive feedback associated with the calculated weighted rank for the one or more stopover points associated with the new trip.

12. The computer program product of claim 11, wherein the feedback comprises: an analyzed image from the one or more stopover points and an age of the calculated weighted rank of the one or more stopover points.

13. The computer program product of claim 8, wherein the program instructions to create a route for the new trip, based in part on the weighted rank for the one or more stopover points and the selection from the traveler, further comprises:
program instructions to combine at least two stopover points from two different planned trips from the social media website.

14. The computer program product of claim 8, further comprising:
program instructions to determine an object at the one or more stopover points; and
program instructions to output a determination, to the user, about information associated with the object at the one or more stopover points.

15. A computer system comprising:
one or more computer processors;
one or more computer readable storage media;
program instructions stored on the one or more computer readable storage media for execution by at least one of the one or more processors, the program instructions comprising:

program instructions to extract information associated with a completed trip from one or more social media websites;

program instructions to create a route for a new trip based on the extracted information associated with the completed trip;

program instructions to generate one or more stopover points for the planned trip by accessing identified points of interests from the information associated with the completed trip;

program instructions to assign weight values for each of the one or more stopover points based on recognized objects, facial expressions, weather information, and user preferences;

program instructions to calculate weighted rank for each of the one or more stopover points based on the assigned weight values; and program instructions to, in response to detecting a deviation from the created route, refine the generated one or more stopover points and the created route.

16. The computer system of claim 15, further comprising:
program instructions to update the created route for the new trip, based on feedback from at least one of: the traveler or the social media website.

17. The computer system of claim 15, wherein the user preferences comprise: a start point, a destination point, cost preferences of the traveler, distance traveled preferences of the traveler, time preferences of the traveler, an image of each traveler on the new trip, and a rating associated with each landmark.

18. The computer system of claim 15, further comprising:
program instructions to receive feedback associated with the calculated weighted rank for the one or more stopover points associated with the new trip.

19. The computer system of claim 18 wherein the feedback comprises: an analyzed image from the one or more stopover points and an age of the calculated weighted rank of the one or more stopover points.

20. The computer system of claim 15, wherein the program instructions to create a route for the new trip, based in part on the weighted rank for the one or more stopover points and the selection from the traveler, further comprises:
program instructions to combine at least two stopover points from two different planned trips from the social media website.

* * * * *